June 3, 1952 — G. A. PRITCHARD — 2,599,014
WEATHER SHIELD FOR AUTOMOBILE WINDOWS
Filed April 12, 1950
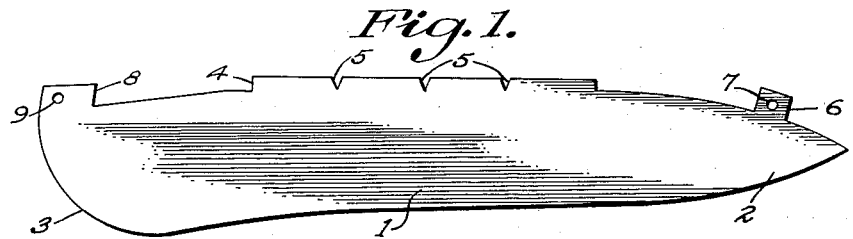
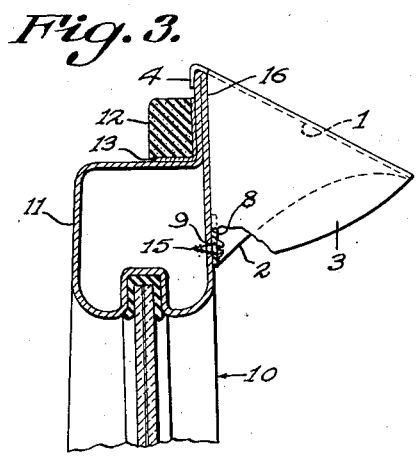
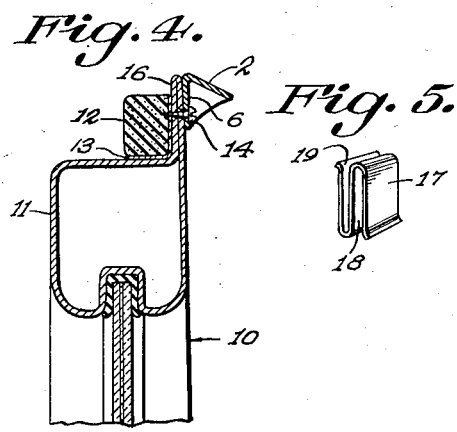
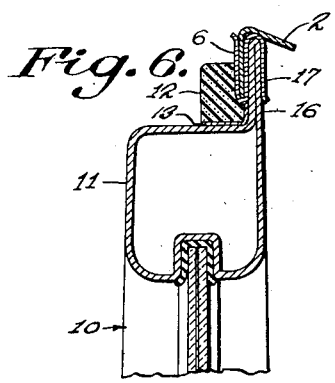
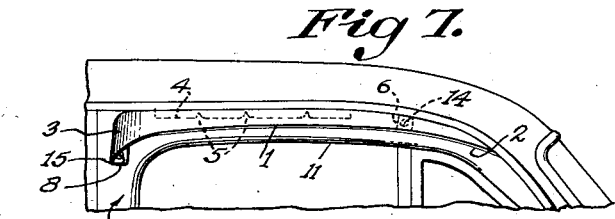
INVENTOR.
George A. Pritchard
BY
ATTORNEYS.

Patented June 3, 1952

2,599,014

UNITED STATES PATENT OFFICE 2,599,014

WEATHER SHIELD FOR AUTOMOBILE WINDOWS

George A. Pritchard, Atlantic Beach, Fla.

Application April 12, 1950, Serial No. 155,417

10 Claims. (Cl. 296—44)

This invention relates to a shield of the type mounted above the window of an automobile door for the purpose of protecting the interior of the vehicle against the elements while providing for proper ventilation thereof.

It can be fairly stated, I believe, that the development of this art has proceeded along lines which have resulted in shields of the type described falling into two main categories. In one of these the shields are fitted into the top edge of the channel of an automobile window. In the other, the shield mounts upon the top edge of the automobile door itself. The present invention is concerned with a shield of the latter type.

I have found that in shields of the latter category, the door-engaging portions thereof tend to rigidify the shield to an excessive extent, as a result of which it becomes difficult to adapt the shield, during installation, to the exact curvature of the top edge of the automobile door.

The present invention therefore has as one important object the provision of a shield adapted for accurate and easy flexure into correspondence with the curvature of the door edge at any location intermediate its ends without interference from the door-engaging portion and attaching means with which the shield is equipped.

Additionally, these shields as heretofore constructed have in general required attachment to the door at many locations intermediate the opposite ends thereof, often involving the drilling of a considerable number of holes in the door, and presenting other difficulties to the installer by reason of complexity of construction. Accordingly, another important object of the invention is to provide a shield of simple one-piece construction integrally formed at opposite ends with means attachable rigidly to the outer surface of an automobile door and cooperating with an intermediate means, also integral with the shield, which is merely hung over the top edge of the door, thus to mount the shield swiftly and with minimum difficulty in fixed position upon the door while actually securing the shield to the door at its ends only.

With the foregoing and other objects in view which will appear as the description proceeds, the invention consists of certain novel details of construction of parts, hereinafter more fully described and pointed out in the claims, it being understood that changes may be made in the construction and arrangement of parts without departing from the spirit of the invention as claimed.

Referring to the drawings:

Figure 1 is a plan view of the flat blank from which the shield is formed.

Figure 2 is a top plan view of the completed shield.

Figure 3 is an enlarged end elevational view of the shield looking toward the front end thereof, part being broken away, an automobile door on which the shield is mounted being shown in transverse section.

Figure 4 is a transverse sectional view through the front end portion of the shield and attaching means.

Figure 5 is a perspective view of a clip comprising a modified attaching means.

Figure 6 is a transverse sectional view through the front end portion of the shield and modified attaching means.

Figure 7 is a side elevational view of the shield, an automobile door on which said shield is mounted being shown fragmentarily.

Referring to the drawing in detail, the shield constituting the present invention is formed from a single flat blank of sheet metal or other suitable material, cut or otherwise formed to the shape illustrated in Figure 1. In this figure, it will be seen that the blank is of generally elongated appearance, and is formed with a relatively long intermediate portion 1 the opposite edges of which are approximately parallel, the intermediate portion merging at its front end into the gradually tapered front end portion 2 the opposite edges of which converge gradually along gently curving lines to form a point at the front end of the shield.

Rearwardly, the intermediate portion merges into the rear end portion 3, the outer edge of which is curved inwardly rather sharply to the substantially straight inner or door-engaging edge of the shield, as clearly shown in Figure 2.

Located substantially medially of the shield, and extending approximately the full length of the straight flat immediate portion 1, is a longitudinal flange 4 formed upon the door-engaging edge of the shield body. The flange 4 is formed with a longitudinal series of spaced V-shaped notches 5, these being for the purpose of permitting a certain amount of longitudinal distortion of the flange to fit the top edge of the particular automobile door to which the shield is to be applied, the top edges of some doors not being wholly straight.

The longitudinal flange 4 defines an intermediate attaching means upon the shield, that cooperates with front and rear end attaching means formed thereupon. The front means comprises an ear 6 having the small openings 7, said ear being projected laterally from the door-engaging edge of the front end portion 2 of the device. The rear attaching means comprises an ear 8 having the small opening 9 and formed upon the rearmost part of the door-engaging edge of the shield.

A blank shaped to the illustrated and described configuration is now bent longitudinally along curving lines at the front and rear ends of the intermediate portion 1, so as to turn downwardly the front and rear end portions 2 and 3 in order that they will extend approximately parallel to and above the window of the automobile door, as best seen from Figure 7.

A typical automobile door construction, to which the shield is readily applied, is shown as including the door generally designated 10 and formed with the window casing 11, to the top edge of which is secured the soft rubber weatherstrip 12 seated in the metallic flange 13. So as to be readily mounted on a door of this type, the shield construction is completed by bending of the flange 4, and ears 6 and 8, at acute angles to the shield proper.

The shield is now readily mounted upon the door 10, by positioning thereof against the top edge of the door, the ears 6 and 8 being placed against the outer surface of the window casing. Screws 14 and 15 are extended through the openings of the ears 6 and 8, and are threaded through small openings drilled in the window casing 11 for this purpose. The ends of the shield are thus fixedly attached in place to the top portion of the window casing, the elongated flange 4 of the medial portion of the shield being in the meantime hung over the upstanding top flange 16 of the window casing, as readily seen in Figure 3, so as to cooperate with the end attaching means in mounting of the shield securely upon the door. Should the top of the door be curved, as would be the case with some automobiles, the flange 4 and body 1 of the shield are capable of being shaped correspondingly during the mounting of the shield upon the door, by reason of the spaced notches 5. These notches extend in depth to the base of the flange 4, as may be noted from Figure 2 and as a result, both the flange 4 and the body 1, though intersecting at acute angles and being of substantial length, are readily deformable longitudinally thereof for shaping to the contour of the top door edge.

In Figures 5 and 6, there is illustrated a clip 17 of S-shape and having the oppositely extending recesses 18 and 19, this clip being utilized as a fastening means that may be used if desired in place of the screw 14. Thus, the ear 6 can be positioned in the upwardly extending recess 19 of the spring clip 17 and is resiliently gripped therein. Received in and resiliently gripped by the walls of the downwardly extending recess 18 is the upstanding top flange 16 of the door.

Other clips 17 can be utilized if desired to support and grip the flange 4, at intervals spaced longitudinally thereof, and are effectively held in place by insertion of the interiorly disposed portion of the clip between the rubber weatherstrip 12 and the top flange 16 of the automobile door.

It is an important characteristic of the invention that the shield is specifically adapted for flexure at any point from end to end thereof into exact correspondence with the top edge of the particular door on which it is to be mounted, without interference from the door-engaging flange 4. The flange 4, in fact, cooperates in achieving proper longitudinal curvature of the body 1 of the shield, by reason of the fact that the installer need merely hang the flange over the top edge of the door, after which he bends the flange 4 in its own plane into longitudinal contact with said door edge at every point longitudinally of the flange. As he performs this operation, the body 1 shapes itself correspondingly.

Any curvature to be imparted to the end portions on account of the particular door conformation, meanwhile, is readily achieved since these end portions are wholly free of connections to the door or rigidifying flanges except at their outer ends, where they are provided with the tabs 6 and 8.

With further reference to the installing operation, it may be noted that after curving the shield as necessary, the installer simply "spots" the locations at which openings are to be made in the door for the fastening elements, one at each end of the shield, using the shield itself as a template. The openings are then made and the shield permanently attached.

I claim:

1. A shield for automobile windows comprising a body proportioned to extend along the top end of an automobile door, downwardly extended end portions on said body, a downturned and narrow longitudinal flange on said body terminating short of said end portions and engaging over and free of attachment to said top end, and tabs at the outer ends of the respective end portions extending outwardly from said body a distance greater than the distance said flange extends outwardly from said body, said tabs being adapted for rigid attachment to a door, said end portions being otherwise unflanged and being freely bendable longitudinally thereof for substantially their full lengths.

2. A shield for automobile windows comprising a body proportioned to extend along the top end of an automobile door, downwardly extending end portions on said body, a downturned longitudinal flange on said body engaging over said top end, said flange being notched at spaced intervals for adjusting the curvature of the flange in its own plane, and means for securing said end portions to said door.

3. A shield for automobile windows comprising a body proportioned to extend along the top end of an automobile door, downwardly extended end portions on said body, a downturned longitudinal flange on said body engaging over said top end, said flange being notched at spaced intervals for adjusting the curvature of the flange in its own plane, and tabs on said end portions disposed in substantially vertical planes and adapted for rigid connection to a substantially vertical surface of said door.

4. A shield for automobile windows comprising a body proportioned to extend along the top end of an automobile door, downwardly extended end portions on said body, a downturned longitudinal flange on said body engaging over said top end, said flange being notched at spaced intervals for adjusting the curvature of the flange in its own plane, and tabs at the outer ends of the respective end portions adapted for rigid attachment to a door, said end portions being otherwise unflanged and being freely bendable longitudinally thereof for substantially their full lengths.

5. A shield for automobile windows comprising a body proportioned to extend along the top end of an automobile door, downwardly extended end portions on said body, a downturned longitudinal flange integral with said body and engaging over said top end, means for adjustably curving the flange in its own plane, comprising the edges of a plurality of spaced-apart notches extending into said flange from its longitudinal edge, and tabs on said end portions, said tabs being narrow, spaced substantial distances from said flange, disposed in substantially vertical planes and adapted for rigid connection to a substantially vertical surface of said door.

6. A shield for automobile windows comprising a body proportioned to extend along the top end of an automobile door, downwardly extended end portions on said body, a downturned longitudinal flange integral with said body and engaging over said top end, means for adjustably curving the flange in its own plane, comprising the edges of a plurality of spaced-apart notches extending into said flange from its longitudinal edge, and narrow tabs on the end portions, said tabs being spaced substantial distances from said flange and adapted for rigid attachment to a door, said end portions being otherwise unflanged and being freely bendable longitudinally thereof for substantially their full lengths.

7. A shield for automobile windows comprising a body proportioned to extend along the top end of an automobile door, downwardly extended end portions on said body, a downturned longitudinal flange on said body engaging over said top end and free of connections with said top end, said flange having V-shaped spaced notches extending in depth to the base of the flange and constituting means for adjustably curving the flange in its own plane, and means for securing said end portions to said door.

8. A shield for automobile windows comprising a body proportioned to extend along the top end of an automobile door, downwardly extended end portions on said body, a downturned longitudinal flange on said body engaging over said top end and free of connections with said top end, said flange having V-shaped spaced notches extending in depth to the base of the flange and constituting means for adjustably curving the flange in its own plane, and tabs on said end portions disposed in substantially vertical planes and adapted for rigid connection to a substantially vertical surface of said door.

9. A shield for automobile windows comprising a body proportioned to extend along the top end of an automobile door, downwardly extended end portions on said body, a downturned longitudinal flange on said body engaging over said top end and free of connections with said top end, said flange having V-shaped spaced notches extending in depth to the base of the flange and constituting means for adjustably curving the flange in its own plane, and tabs at the outer ends of the respective end portions adapted for rigid attachment to a door, said end portions being otherwise unflanged and being freely bendable longitudinally thereof for substantially their full lengths.

10. A shield for automobile windows comprising a body to extend along the top portion of an automobile door, downwardly extending end portions on said body, a longitudinal flange on said body terminating short of said end portion and engaging said top portion of said door, and tabs at the outer ends of the respective end portions adapted for attachment to a door, the parts of said end portions extending between said longitudinal flange and said tabs being unflanged and being fully bendable longitudinally thereof for substantially their full lengths.

GEORGE A. PRITCHARD.

REFERENCES CITED

The following references are of record in the file of this patent:

UNITED STATES PATENTS

| Number | Name | Date |
|---|---|---|
| D. 102,974 | Pritchard | Jan. 26, 1937 |
| 2,034,342 | Hay | Mar. 17, 1936 |
| 2,108,322 | Thorp | Feb. 15, 1938 |

OTHER REFERENCES

Motor (periodical), vol. No. 92; Issue No. 5; published Nov. 1949; page 115, "Auto Ventshade."